(12) United States Patent
Inoue et al.

(10) Patent No.: US 7,498,541 B2
(45) Date of Patent: Mar. 3, 2009

(54) METHOD OF ASSEMBLING MOTOR VEHICLE BODY

(75) Inventors: Shinobu Inoue, Ikeda (JP); Masaharu Saito, Ikeda (JP); Akiyoshi Hazama, Ikeda (JP); Yasuhiro Hosokawa, Ikeda (JP); Takuma Arai, Ikeda (JP); Isao Kita, Ikeda (JP); Takuji Izutani, Ikeda (JP); Kazuto Ikeda, Ikeda (JP)

(73) Assignee: Daihatsu Motor Co., Ltd., Osaka (JP)

( * ) Notice: Subject to any disclaimer, the term of this patent is extended or adjusted under 35 U.S.C. 154(b) by 665 days.

(21) Appl. No.: 10/532,440

(22) PCT Filed: Oct. 17, 2003

(86) PCT No.: PCT/JP03/13336

§ 371 (c)(1),
(2), (4) Date: Apr. 22, 2005

(87) PCT Pub. No.: WO2004/037634

PCT Pub. Date: May 6, 2004

(65) Prior Publication Data

US 2006/0042067 A1    Mar. 2, 2006

(30) Foreign Application Priority Data

Oct. 22, 2002 (JP) ............................. 2002-307052

(51) Int. Cl.
*B23K 37/04* (2006.01)
(52) U.S. Cl. .................. 219/86.24; 219/79; 219/80; 29/428; 29/429; 29/430; 228/212

(58) Field of Classification Search .................. 219/79, 219/80, 117.1, 121.82, 86.24; 29/428–431, 29/464–469, 771; 228/212
See application file for complete search history.

(56) References Cited

U.S. PATENT DOCUMENTS

| 4,162,387 | A | * | 7/1979 | De Candia | 219/79 |
| 4,628,722 | A | * | 12/1986 | Mauer et al. | 29/812.5 |
| 4,670,961 | A | * | 6/1987 | Fontaine et al. | 29/429 |
| 4,928,383 | A | * | 5/1990 | Kaczmarek et al. | 29/711 |
| 4,946,089 | A | * | 8/1990 | Baulier et al. | 228/45 |
| 5,044,541 | A | * | 9/1991 | Sekine et al. | 228/6.1 |
| 5,902,496 | A | * | 5/1999 | Alborante | 219/86.24 |
| 6,100,497 | A | * | 8/2000 | Maruyama et al. | 219/121.63 |
| 6,595,407 | B2 | * | 7/2003 | McNamara et al. | 228/212 |
| 2005/0017057 | A1 | * | 1/2005 | Motomi et al. | 228/212 |

FOREIGN PATENT DOCUMENTS

| JP | 62-279178 | | 12/1987 |
| JP | 02-144267 | | 6/1990 |
| JP | 02144267 | A * | 6/1990 |
| JP | 5-124549 | | 5/1993 |
| JP | 2003-146260 | | 5/2003 |
| WO | WO 03/039941 | A1 * | 5/2003 |

* cited by examiner

*Primary Examiner*—Tu B Hoang
*Assistant Examiner*—Stephen J Ralis
(74) *Attorney, Agent, or Firm*—Hamre, Schumann, Mueller & Larson, P.C.

(57) ABSTRACT

Each of a pair of side members (4) is located relative to an underbody (3) using two locators (16). Each locator is lowered by a lifter (15) and placed on a slide base (18). The slide base is movable along a slide guide (17) toward and away from a transfer conveyor (11).

10 Claims, 16 Drawing Sheets

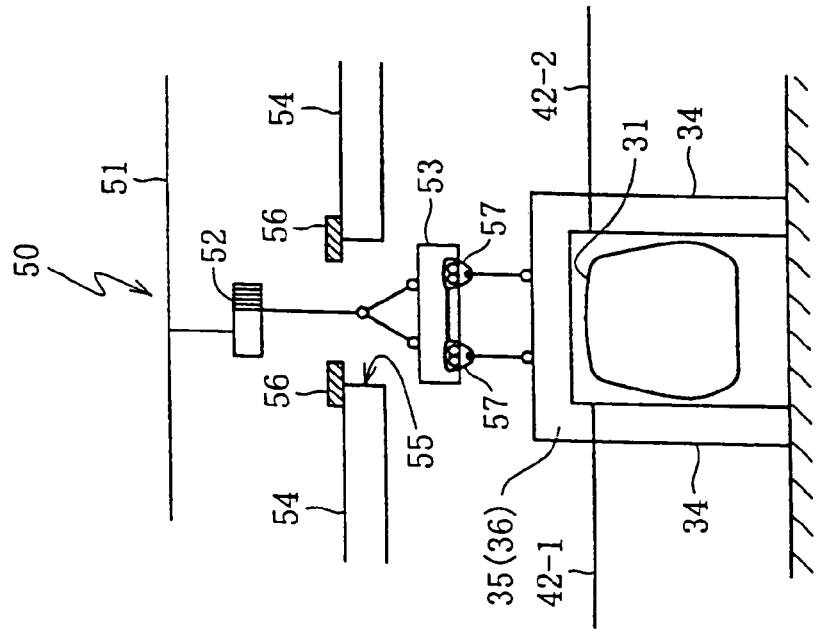
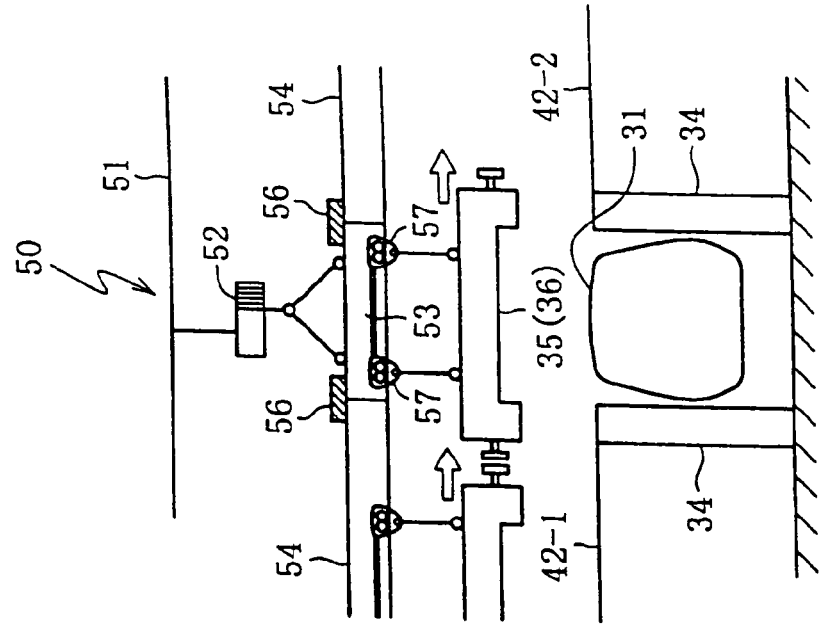

METHOD OF ASSEMBLING MOTOR VEHICLE BODY

TECHNICAL FIELD

The present invention relates to a method of assembling a motor vehicle body. Specifically, the present invention relates to a method for locating a side member relative to an underbody of a car for welding these members together.

BACKGROUND ART

A car body includes main parts such as an underbody, left and right side members, and a roof panel. For assembling a car body from these parts, parts to be fixed are first located to each other using locating jigs, for example. Thereafter, these parts are pre-fixed by spot welding, and then subjected to re-welding for complete fixation.

A conventional method of assembling a car body utilizes a significantly large locating jig for locating the main parts. For example, a jig used for locating the side member is larger than the side member itself. Such a locating jig is designed to be movable toward and away from the car body assembly line. After a side member is set to the locating jig, the jig is moved toward the assembly line, and fixed at a predetermined position. In this state, the side member is pre-welded to the underbody.

The above conventional locating jig is large and heavy, which causes various problems. For example, the initial facility investment tends to be large. Further, it can take a lot of trouble to change locating jigs according to a car type changed, and during the replacement the assembly line may need be completely stopped.

DISCLOSURE OF THE INVENTION

The present invention has been proposed under the above-described circumstances. It is therefore an object of the present invention to realize reduction in size and weight of a locating jig for a side member.

According to the present invention, there is provided a method of assembling a car body. The method comprises the steps of: locating a lower end of a vertical side member relative to an end of an underbody held at a predetermined position of a car body assembling line; locating the side member to the underbody at not less than two portions of the lower end; and temporarily welding, in such a locating state, the side body to the underbody. The car body assembly line is provided, in the vicinity thereof, with a slide base which is movable toward and away from the assembly line. Further, the car body assembly line is provided, in the vicinity, with a locator freely-removable and placeable on the slide base for locating the side member, and with a lifter for placing the locator on the slide base when the slide base is away from the assembly line. The locator is placed onto the lifter when the lifter is at an upper position. The locator is placed onto the slide base when the lifter is lowered. The side member is supported by the locator, and the side mount is moved toward the car body assembly line for locating the side member relative to the underbody.

A human operator may transfer the side member manually or by using a transfer machine. The side member, after transferred to a human assembler, is attached to at least two locators. After the attachment, the side member is moved to a predetermined position of the underbody (the side member is held upright). The side member attached to the two locators is then connected to the underbody at its lower end, and pre-fixed at not less than two portions. Conventional locating jig for side member is needed to be large for clamping entire side member. According to the present invention, the side member is supported by a plurality of locators at not less than two portions of its lower end (the vertically placed side member is temporarily supported by a transfer hoist for example, thereby prevented from falling sideways). In this way, the locator can be small in size and weight.

Preferably, the lifter is lifted up to detach the locator from the slide base. When the lifter is at the upper position, the locator is removed from the lifter while a second locator is placed onto the lifter. Thereafter, the lifter is lowered to place the second locator onto the slide base.

According to the above method, it is possible to effectively replace one locator by another.

Preferably, the locator is smaller than the side member, as viewed in the vertical direction and in a direction parallel to the transfer direction of the assembly line.

Preferably, the slide base is provided with a plurality of upwardly protruding locating pins, while the locator is formed with a plurality of insertion holes corresponding to the locating pins.

Preferably, the locator includes a bottom surface provided with a plurality of wheels for facilitating positional shift of the locator.

Preferably, the lifter includes two supporting plates spaced from each other. The locator is supported by the supporting plates via the wheels.

Preferably, the two supporting plates are spaced from each other at a distance great enough to allow insertion of the slide base therebetween.

Preferably, each of the supporting plates of the lifter is provided with a locating member for engaging with the wheel.

Preferably, the two locators are connected to each other via a connecting rod, and is moved synchronously by the connecting rod.

BRIEF DESCRIPTION OF THE DRAWINGS

FIG. 18A is a schematic front view illustrating a transfer system for locating joisted jigs used at the roof pre-setting station.

FIG. 18B is a view illustrating a movable rail of the transfer system in a lower position.

BEST MODE FOR CARRYING OUT THE INVENTION

Preferred embodiments of the present invention are described in detail below with reference to the accompanying drawings.

Figure 1:
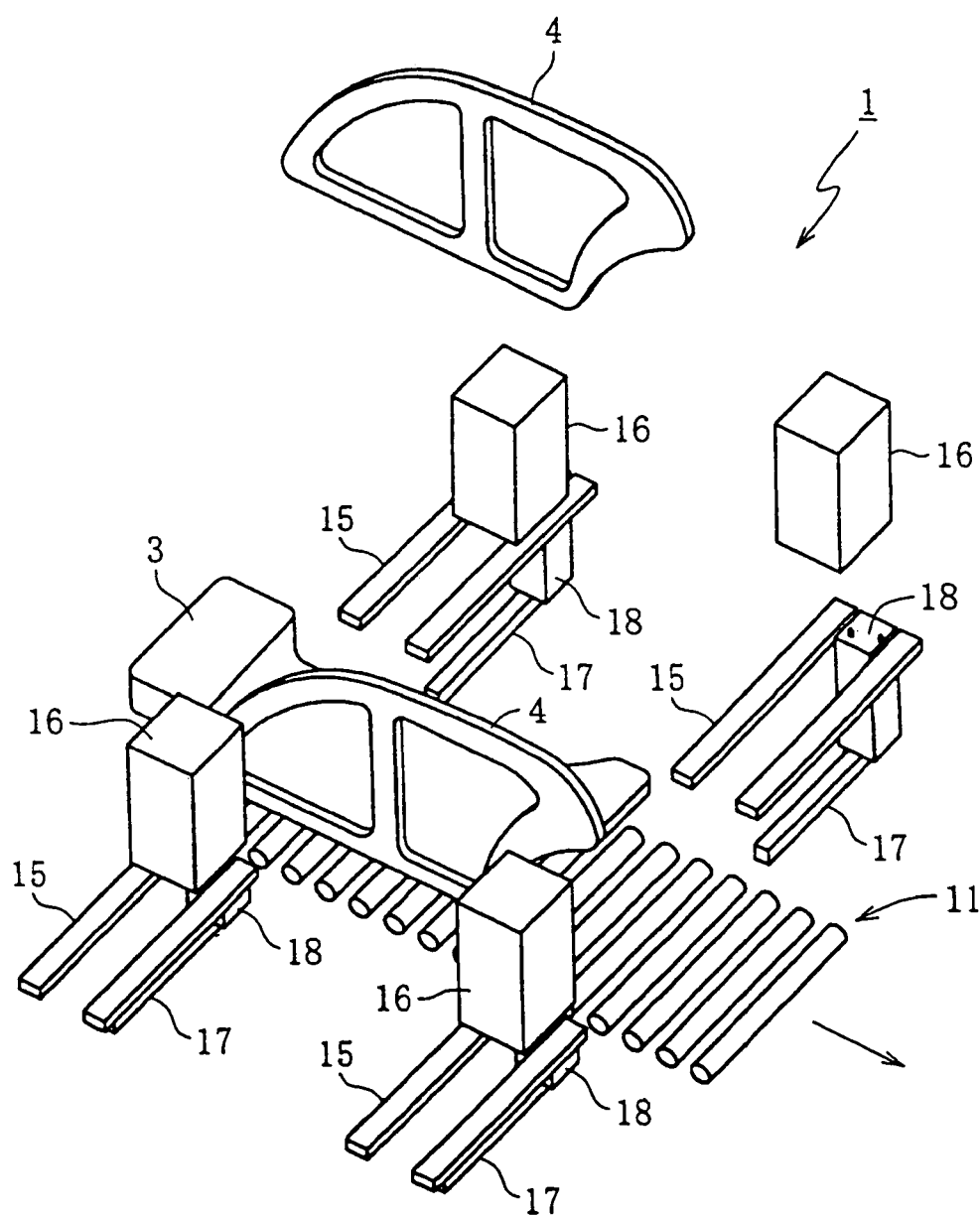
FIG. 1 is a schematic perspective view illustrating a pre-welding station for provisionally welding a side member of a car to an underbody.

FIG. 1 is a schematic view illustrating a side member pre-welding station 1. The side member pre-welding station 1 is installed at a predetermined position in a car body assembly line 2 (see FIG. 2). The car body assembly line 2 includes an underbody loading station (not shown) installed upstream from the side member pre-welding station 1 (to the left side in FIG. 2). At the underbody loading station, an underbody 3 is placed onto coasters 13a, 13b (see FIG. 3). Thereafter, the underbody 3 is transferred by a roller conveyor 11 (see FIG. 4), with its rear portion, for example, located downstream of the car body assembly line 2, to be forwarded to an underbody setting station 5 (#0) and the side member pre-welding station 1 (#1). The roller conveyor 11 includes a plurality of rotatable rollers 11a, each spaced to each other at a predetermined distance in the transfer direction of the underbody 3 and so on.

Figure 2:
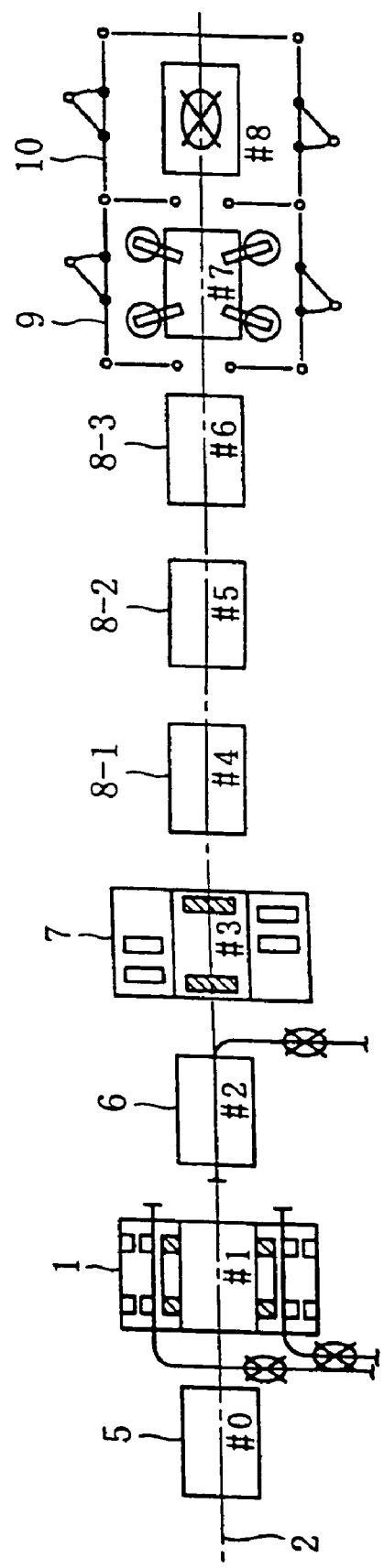
FIG. 2 is a schematic plan view illustrating the structure of a car body assembly line.
Figure 3:
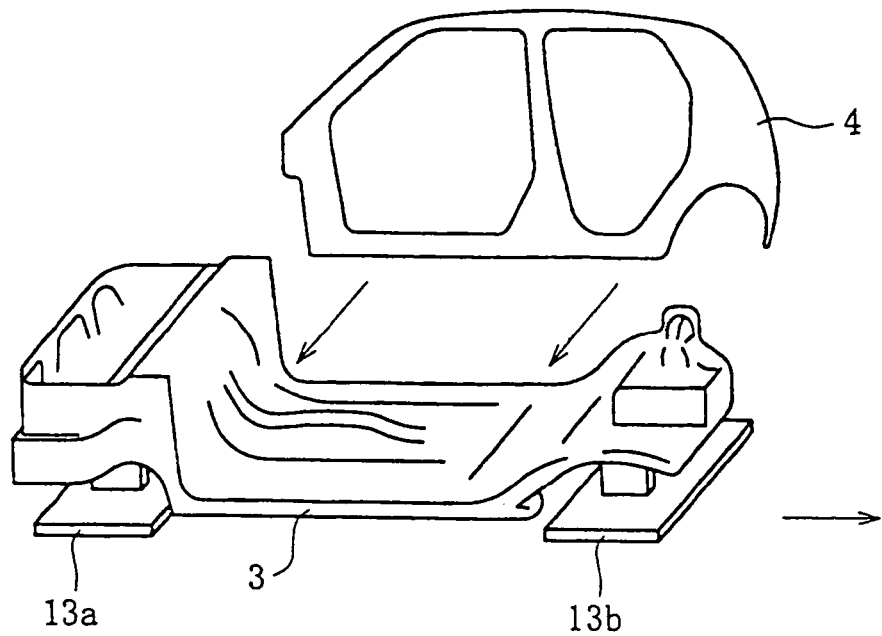
FIG. 3 is a schematic view illustrating the underbody supported by two transfer coasters, and the side member to be fixed to the underbody.

As shown in FIG. 2, the downstream side of the side member pre-welding station 1 (#1) is provided with a roof pre-setting station 6 (#2) and a roof pre-welding station 7 (#3). At the roof pre-setting station 6, a roof panel is pre-set on a side member 4, and the side member 4 is permanently welded to the underbody 3. A roof re-welding station (#4) is provided downstream of the roof pre-welding station 7 (#3). When many portions of the roof panel is to be permanently welded, as shown, a plurality of roof re-welding stations 8-1 (#4)-8-3 (#6) are provided so that workload for re-welding per one worker does not become too much. Downstream from the roof re-welding station, there are a final welding station 9 (#7) equipped with a welding robot, and an unloading station 10 (#8).

At the side member pre-welding station 1 and the roof pre-setting station 6, the height of the underbody 3 may need to be adjusted according to the car types. For this adjustment, each of the stations 1 and 6 is equipped with an elevating mechanism for lifting the conveyor 11. As shown in FIG. 4B, this elevating mechanism is a pantograph mechanism 14, for example. The pantograph mechanism 14 includes a plurality of supporting members 14a (pivotably connected by a pin 14b), an air cylinder 14c, and a sliding mechanism 14d. The lower end of one of the supporting members 14a is reciprocally moved in the horizontal direction by the air cylinder 14c via the sliding mechanism 14d, thereby lifting and lowering the conveyor 11.

Figure 5:
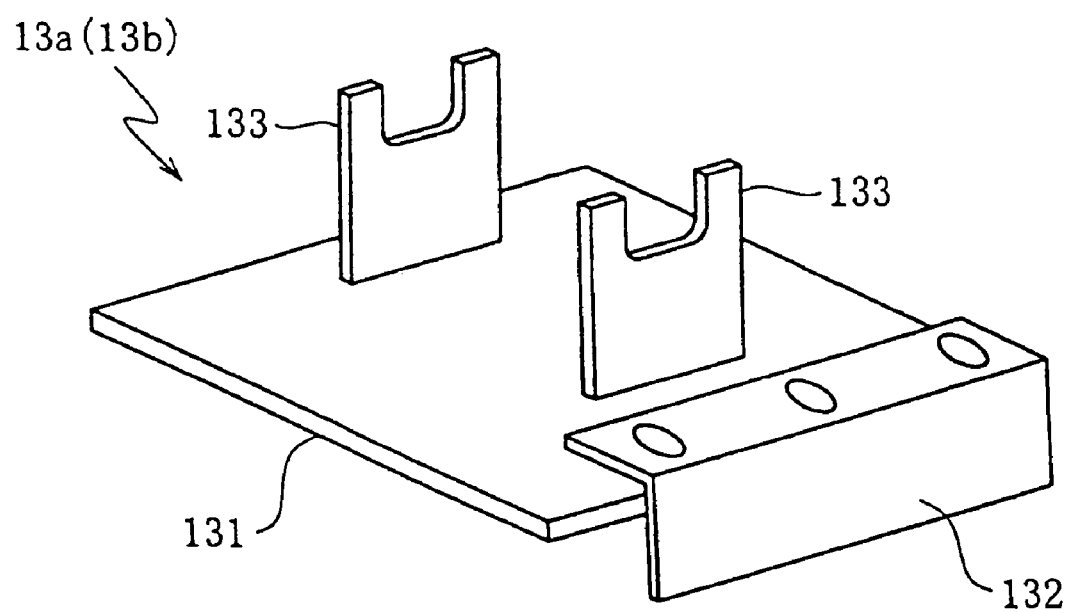
FIG. 5 is a schematic perspective view illustrating the coaster.

FIG. 5 illustrates the coasters 13a (13b) on which the underbody 3 is placed. Each of the coasters 13a (13b) includes a base 131 for engaging with the rollers 11a of the conveyor 11. The upper surface of the base 131 is provided with a pair of vertical supporting members 133 for supporting the under body 3. The supporting members 133 are spaced to each other widthwise of the base 131 (perpendicularly to transfer direction). The width of the base 131 is shorter than the length of the roller 11a. One end of the base 131 is provided with an angle bar 132 fixed by a bolt for preventing the coaster from moving widthwise during transfer. Such an angle bar may be fixed at the other end of the base 131.

Figure 4A:
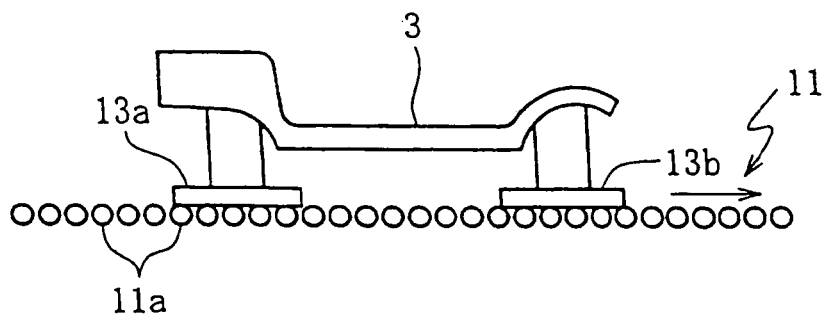
FIG. 4A is a schematic side view illustrating a roller conveyor for transferring the underbody shown in FIG. 3.
Figure 4B:
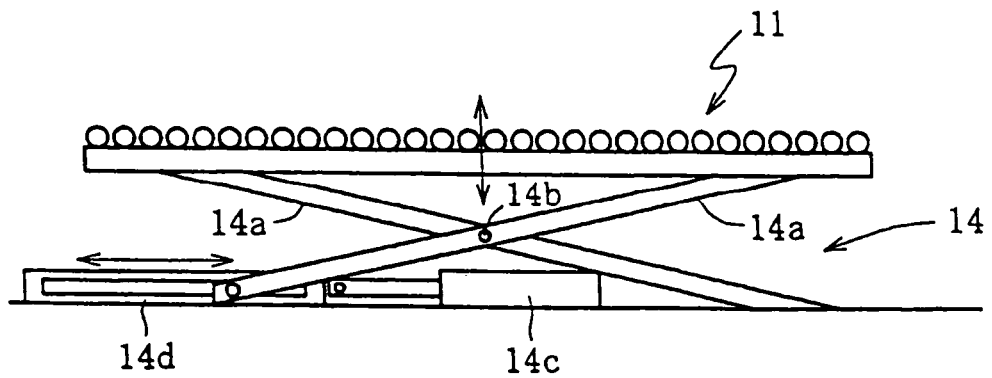
FIG. 4B is a schematic side view illustrating an elevating mechanism for adjusting the height of the roller conveyor.

As shown in FIG. 4A, the coasters 13a, 13b are arranged to support the front and rear portions of the underbody 3. As described above, each of the coasters includes two supporting members 133 (see FIG. 5). Thus, the underbody 3 is supported by the coasters 13a, 13b at four portions. A worker pushes the underbody 3 by hand to transfer the underbody 3 on the roller conveyor 11.

Figure 7:
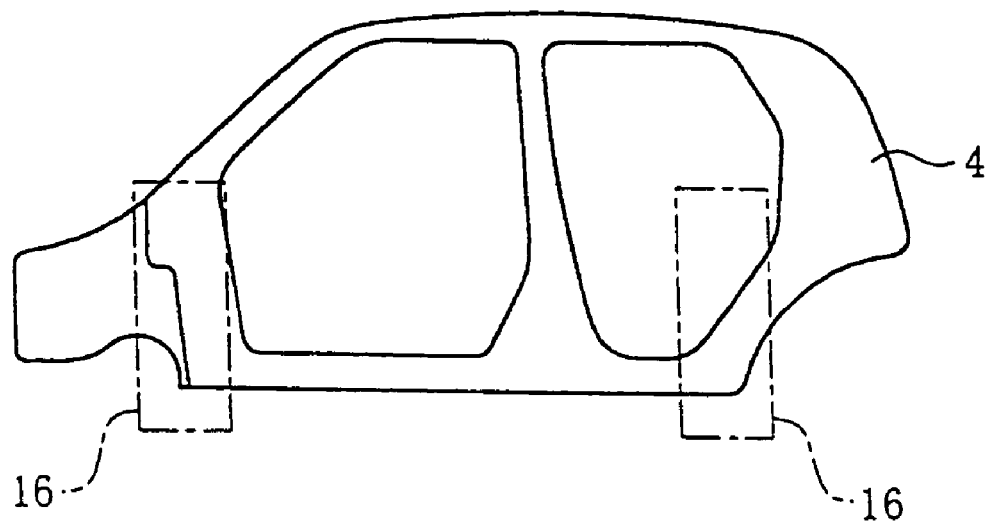
FIG. 7 is a side view illustrating the side member at the pre-welding station.

As shown in FIG. 1, the side member pre-welding station 1 is provided with a plurality of locators 16 for locating the left and right side members 4. In the illustrated example, two locators 16 are provided for each side member 4 (see also FIG. 7), and the locators are spaced to each other in the transfer direction of the assembly line. Each locator 16 includes an engaging means (not shown) for engaging with a predetermined portion of the side member 4. Examples of the engaging means include a clamp mechanism or a suction mechanism, for example. The bottom portion of the side member 4 is held by the locators 16 when pre-fixed to the underbody 3. As shown in FIG. 7, the locators 16 are smaller than the side member 4 as seen in the vertical direction (vertical direction in FIG. 7) and in the direction parallel to the transfer direction of the assembly line (lateral direction in FIG. 7).

Each locator 16 is provided with a lifter 15 including two supporting plates spaced to each other in the transfer direction of the assembly line. The lifter 15 is movable in the vertical direction. Below each lifter 15, a slide guide 17 (see FIG. 1) is installed, extending parallel with the supporting plate above-mentioned. A slide base 18 is on the slide guide 17. The slide base 18 is reciprocally moved along the slide guide 17, manually by the worker.

The lifter 15 can be lowered (and lifted), while supporting the locator 16. The locator 16 placed on the lifter 15 is moved downward and transferred to the lower slide base 18. Thereafter, the slide base 18 is moved along the slide guide 17 to move the locator 16 toward the assembly line 2 (forward) or away from the assembly line 2 (backward).

Figure 6A:
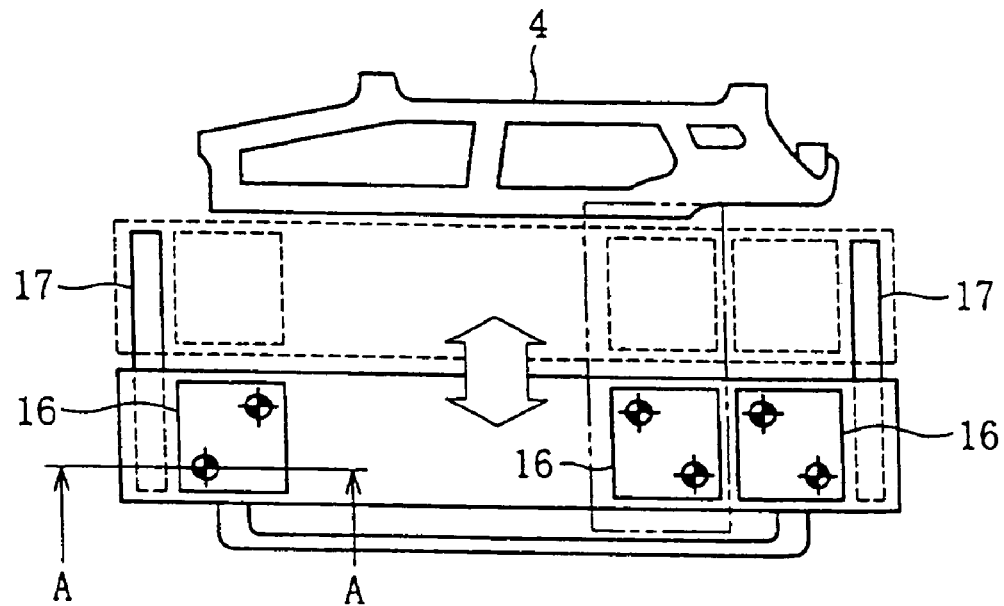
FIG. 6A illustrates an example where three locators are used for one side member.
Figure 6B:
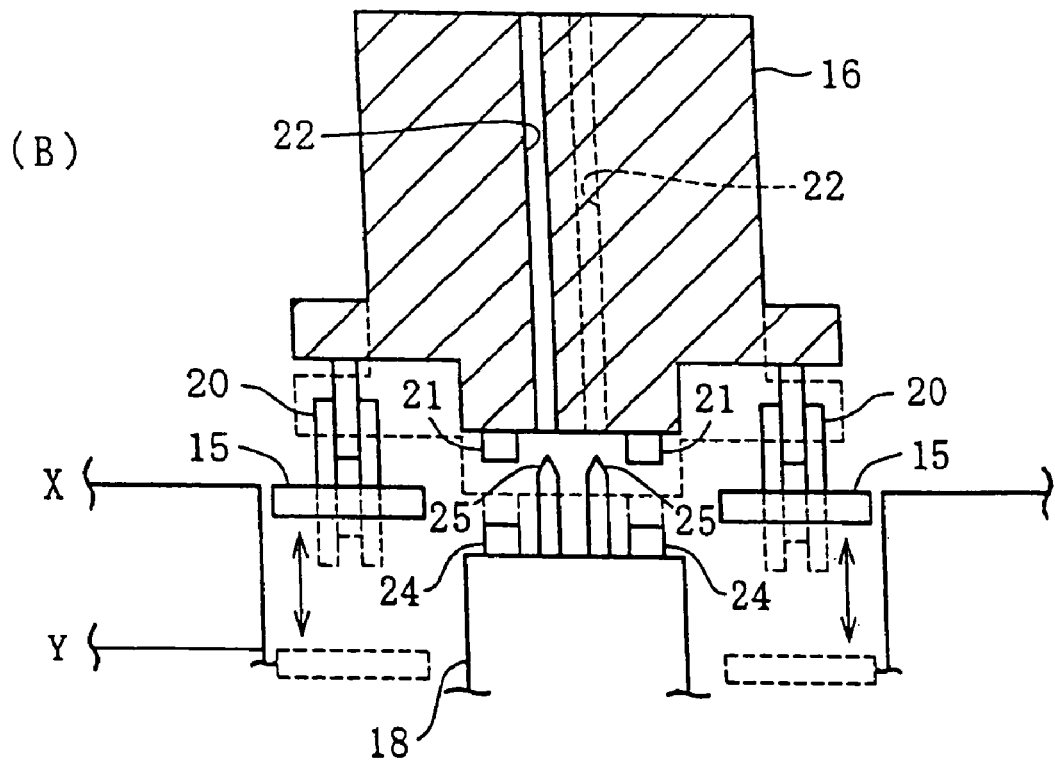
FIG. 6B is a section view taken along the line A-A in FIG. 6A.
Figure 8:
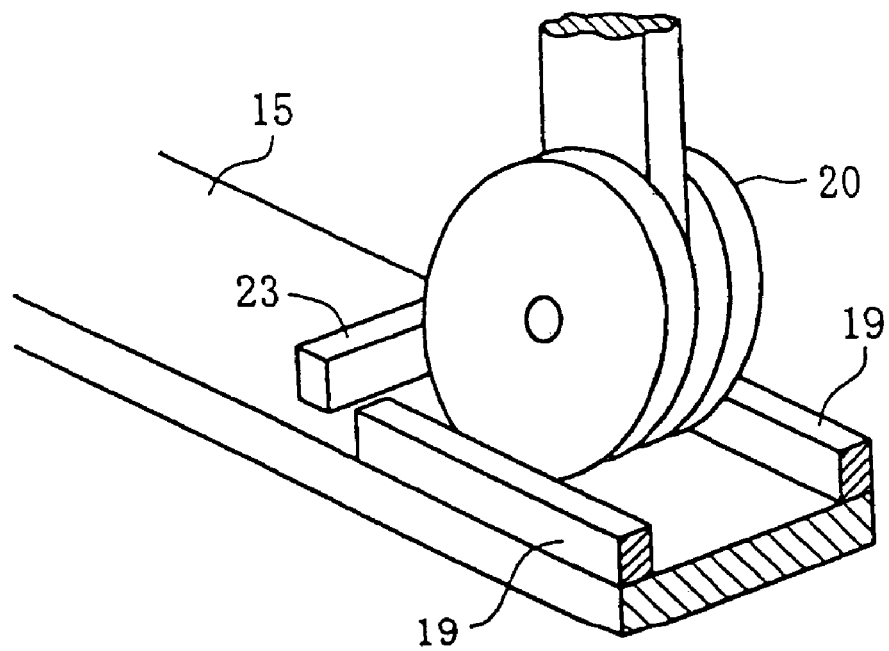
FIG. 8 is a schematic view illustrating a wheel provided at the locator for the side member, and a portion of a lifter on which the wheel is placed.
Figure 11:
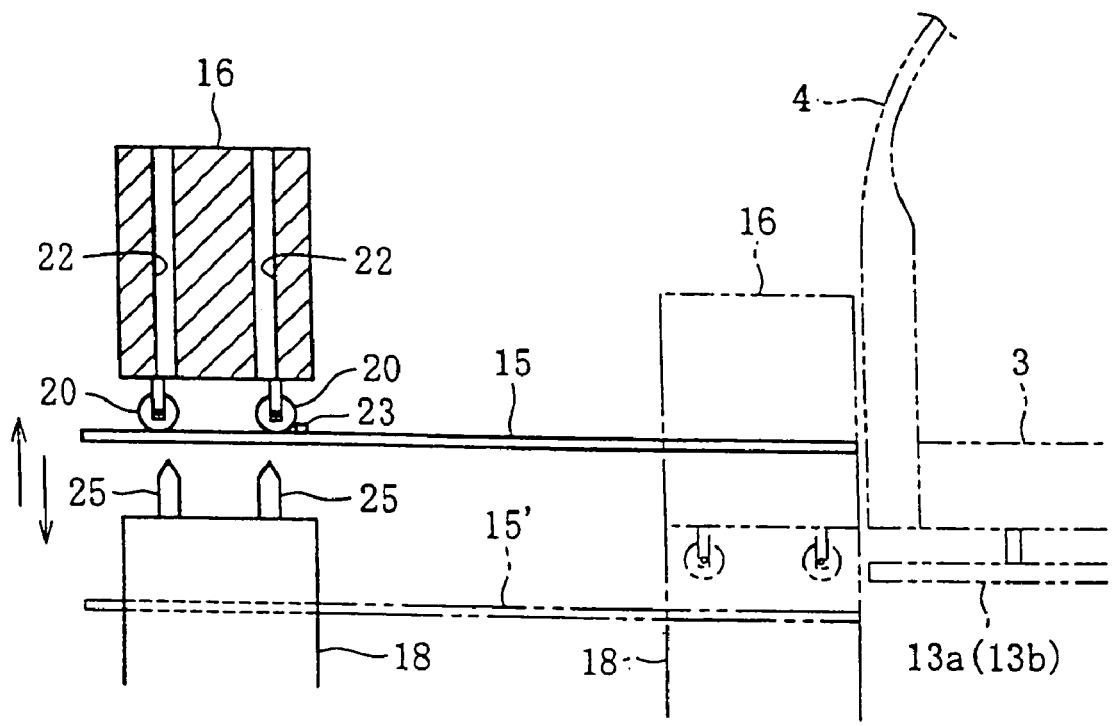
FIG. 11 is a schematic view illustrating a method for placing the locator on the slide base and a method for locating the side member to the underbody using the locator.
Figure 12:
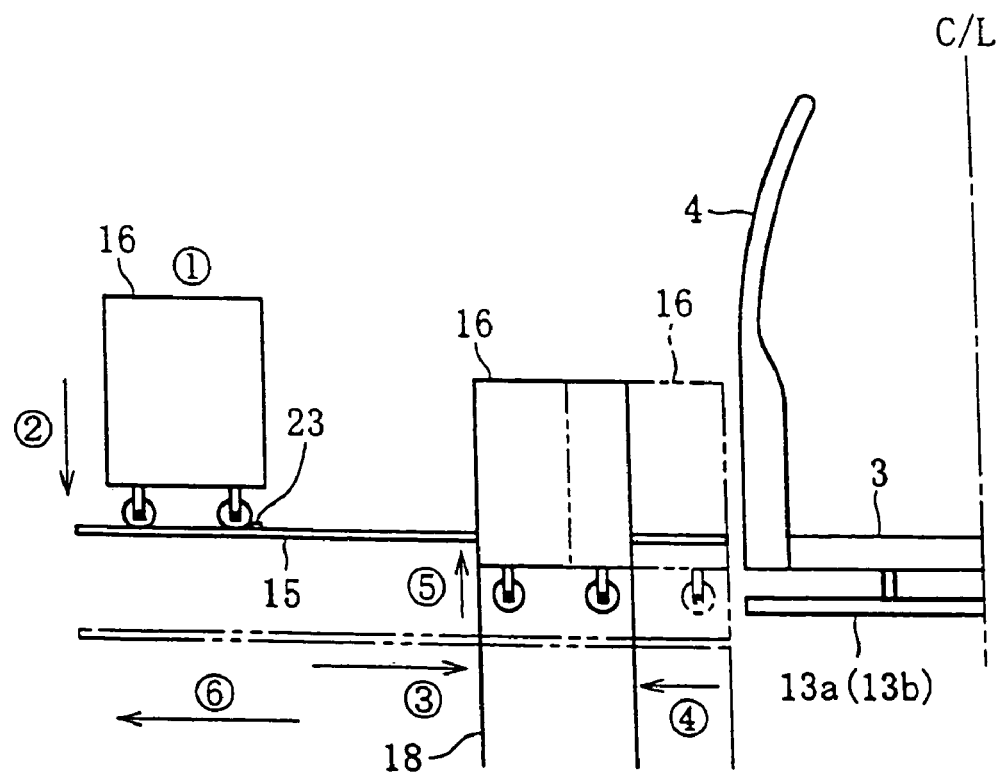
FIG. 12 is a schematic view illustrating a method for replacing the locators.

As can be seen from FIGS. 6B, 11 and 12, each locator 16 includes a bottom surface provided with four wheels 20. Further, as shown in FIG. 6B, the bottom surface of the locator 16 is provided with spacers 21 for adjusting the height of the locator. On the other hand, the slide base 18 includes a top surface provided with spacers 24 which contact with the spacers 21. The locator 16 is formed with a plurality of vertically extending holes 22 into which locating pins 25 of the slide base 18 are inserted. As shown in FIG. 8, the lifter 15 includes a rear end provided with guards 19 and with a stopper 23 with which the wheel 20 contacts for locating the locator 16 provisionally.

As shown in FIG. 6B, the lifter 15 can be lifted up to a position X at a maximum, at which the top surface of the lifter 15 is flush with the floor level. On the other hand, the position Y is a lower limit for the lifter 15 to go down. In the lowering process to the position Y, the locating pin 25 of the slide base 18 is inserted into the hole 22 of the locator 16, so that the locator 16 is held on the slide base 18. As can be seen from the figure, the two supporting plates of the lifter 15 are spaced to each other at a distance enough not to interfere with the slide base 18 during its lowering.

Figure 9:
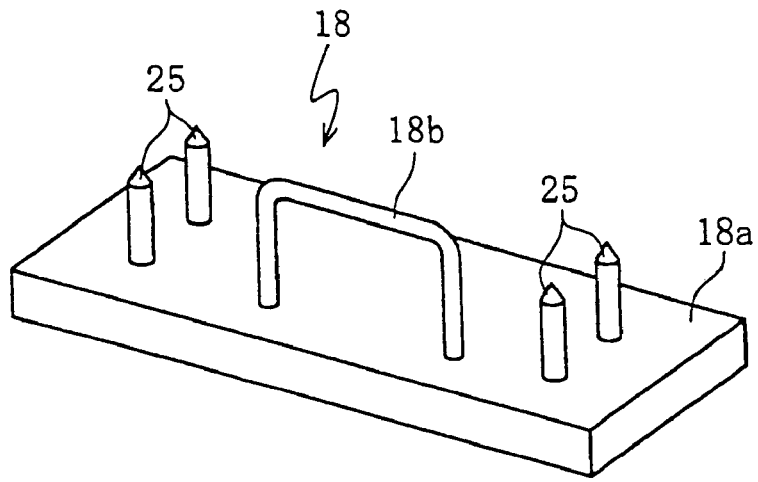
FIG. 9 is a perspective view illustrating an upper portion of a slide base for placing two locators together.
Figure 10A:
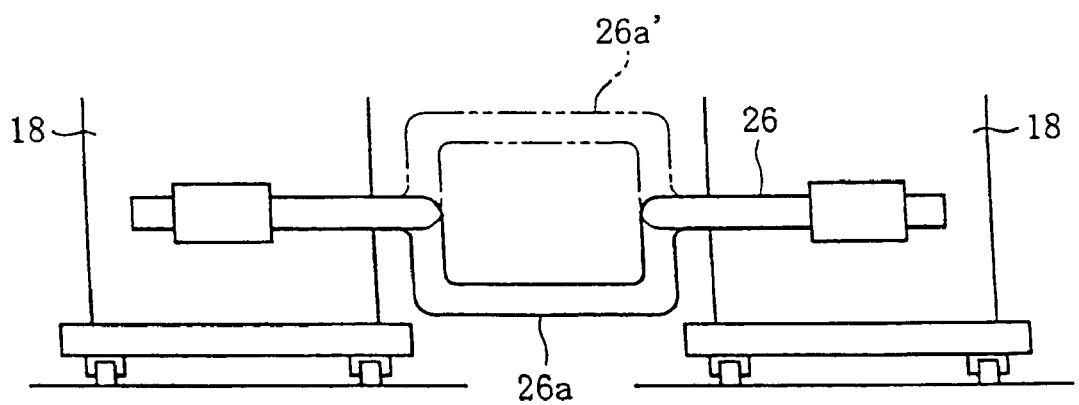
FIG. 10A is a side view illustrating an example of a connecting rod for connecting two slide bases.
Figure 10B:
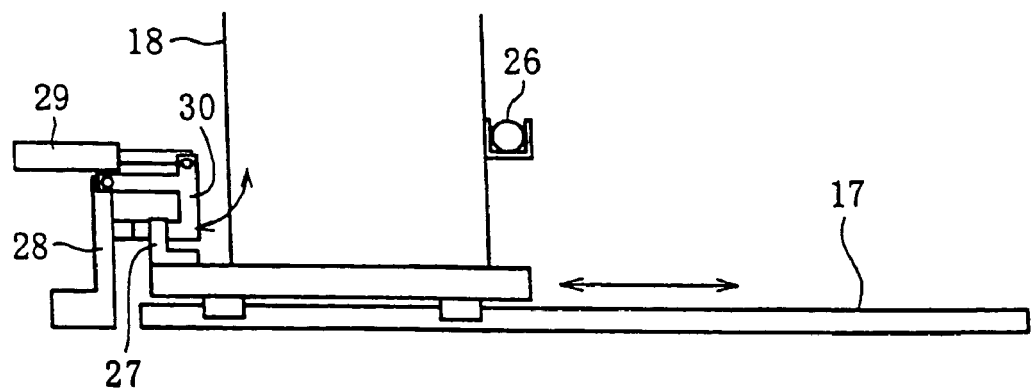
FIG. 10B is a front view illustrating a locating clamp mechanism for the slide base.

According to the present invention, as shown in FIG. 9, two locators 16 may be fixed by one slide base 18. In this structure, the slide base 18 includes a base 18a which is provided with vertical locating pins 25 for locating a plurality of locators 16. The base 18a is further provided with a handle 18b which is grabbed by the worker for moving the slide base 18. As shown in FIGS. 10A and 10B, each locator 16 may also be supported by a respective slide base 18. In this way, the worker can get in between two locators 16 to perform pre-welding. In the illustrated example, two slide bases 18 are connected to each other via a removable connecting rod 26. The connecting rod 26 enables the worker to move two slide bases 18 together forwardly and backwardly. The connecting rod 26 may be linear as a whole, but desirably, is a crank having a bending portion 26a between the locators 16, as shown. With this form, when the bending portion 26a is held downwards (indicated by solid lines in FIG. 10A), the connecting rod 26 does not obstruct the operation at the upper portion of the side member 4. When working on the lower portion of the side member 4, the bending portion 26 is held upwards (indicated by chain double-dashed lines in FIG. 10A).

As shown in FIG. 10B, the slide base 18 may be provided with an angle 27 at the front part (at the side facing the conveyor 11), and the angle 27 may contact with a stopper 28. Desirably, the stopper 28 includes a jaw 30 which is operated by an air cylinder 29. The jaw 30 clamps the angle 27, thereby firmly holding the slide base 18 at a determined position.

For example, the lifter 15 is moved up and down between the above-described positions X and Y (see FIG. 6B) by a pantograph mechanism similar to the one shown in FIG. 4B. When the lifter 15 is lifted to the position X, its top surface is flush with the floor level. In this state, the locator 16 provided with the wheels 20 can be easily moved from the floor to the rear end of the lifter 15. Thereafter, as shown in FIG. 11, the wheel 20 contacts with the stopper 23 to roughly position the locator 16 (see also state indicated by reference number 1 in FIG. 12). The slide base 18 is set below the locator 16. In this state, the lifter 15 is lowered (as indicated by reference number 2 in FIG. 12), and during the lowering process, the locating pin 25 of the slide base 18 is fitted into the hole 25 of the locator 16, whereby the locator 16 is engaged with and positioned on the slide base 18. When the lifter 15 is further lowered, the wheel 20 of the locator 16 is detached from the lifter 15, and the locator 16 is finally positioned on the slide base 18.

Next, the locator 16 holds the side member 4 and the slide base 18 advances along the slide guide 17 toward the assembly line (as indicated by reference number 3 in FIG. 12). Then, as illustrated by chain double-dashed lines in FIG. 11, the side member 4 is positioned relative to the underbody 3 which is on standby. In this state, the side member 4 is pre-fixed to the underbody 3.

After welding, the fixation of the locator 16 relative to the side member 4 is released and the slide base 18 is retreated at a determined distance (as indicated by reference number 4 in FIG. 12). In this position (hereinafter referred to as "standby position"), the locator 16 holds next side member 4 which is to be pre-fixed to next underbody 3.

When an underbody 3 of a type different from the previous underbody is transferred to the side member pre-welding station 1, the previous locator needs to be replaced with a locator of another type. The procedure of the replacement is described below.

First, the slide base 18 and the previous locator 16 are in the above-described "standby position", then the lifter 15 is lifted (as indicated by reference number 5 in FIG. 12). During this elevation, the wheel 20 of the locator 16 rides on the lifter 15, and when the lifter 15 is further lifted, the locator 16 is detached from the slide base 18. After the lifter 15 is lifted up to be flush with the floor level, the wheel 20 is used to move the locator 16 from the lifter 15 to the floor. Thereafter, the locator 16 is moved back to a locator stock area near the car body assembly line 2.

After the previous locator 16 is detached by lifting the lifter 15, the slide base 18 is retreated to the rear end of the slide guide 17 (as indicated by reference number 6 in FIG. 12). On the other hand, another locator 16 is placed on the rear end of the lifter 15 at the upper limit (the position X in FIG. 6B). Thereafter, the lifter 15 is lowered to transfer the locator 16 to the slide base 18.

The locators used in the above procedure are more compact than conventional one. Therefore, a plurality (one or more kinds) of locators can be prepared near the car body assembly line 2 without obstructing the operation. Further, as the wheels 20 are provided at the bottom portion of the locator 16, the worker can move the locator easily. Differently, conventional large jig is stored at a place apart from the car body assembly line 2, and transferred to the side member pre-welding station 1 from the stored place, using a special transfer line, if necessary. With the present invention, such transfer line for jig is unnecessary.

In the example shown in FIG. 1, each side member 4 is provided with two locators 16, though the present invention is not limited to this. For example, as shown in FIG. 6A, three (or more) locators 16 may be used for one side member 4. In this case, each locator may have respective slide guide 17 and slide base 18. Alternatively, a plurality of locators may share one elongated slide base.

Figure 13:
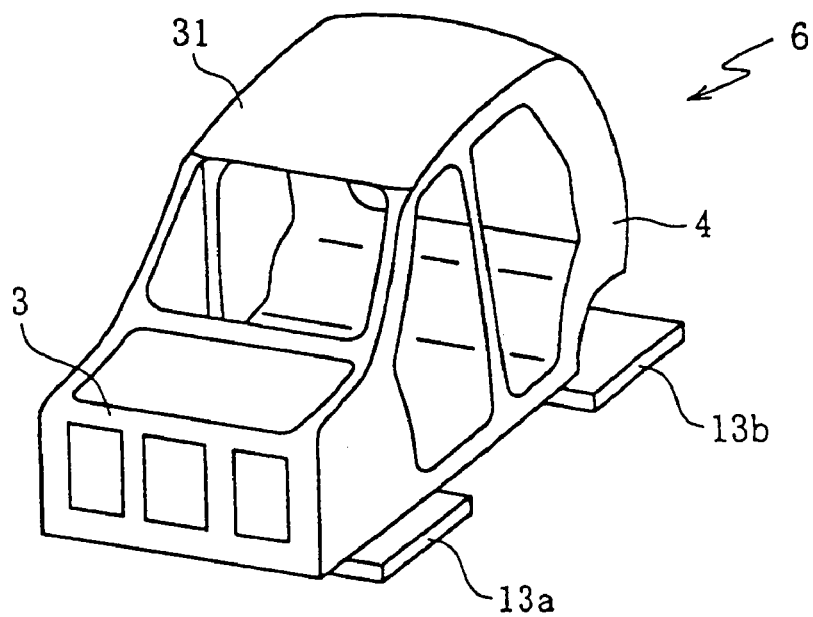
FIG. 13 is a schematic perspective view illustrating the posture of the car body at the roof pre-setting station.

The underbody 3 and the side member 4 pre-fixed to each other are transferred from the pre-welding station 1 to the roof pre-setting station 6. At the station 6, a roof panel 31 is pre-set over the top portion of the side members 4 (see FIG. 13). Further at the station 6, the underbody 3 and the side members 4 are permanently welded. The roof panel 31 is pre-set by the worker manually or using a device such as a hoist.

Figure 14:
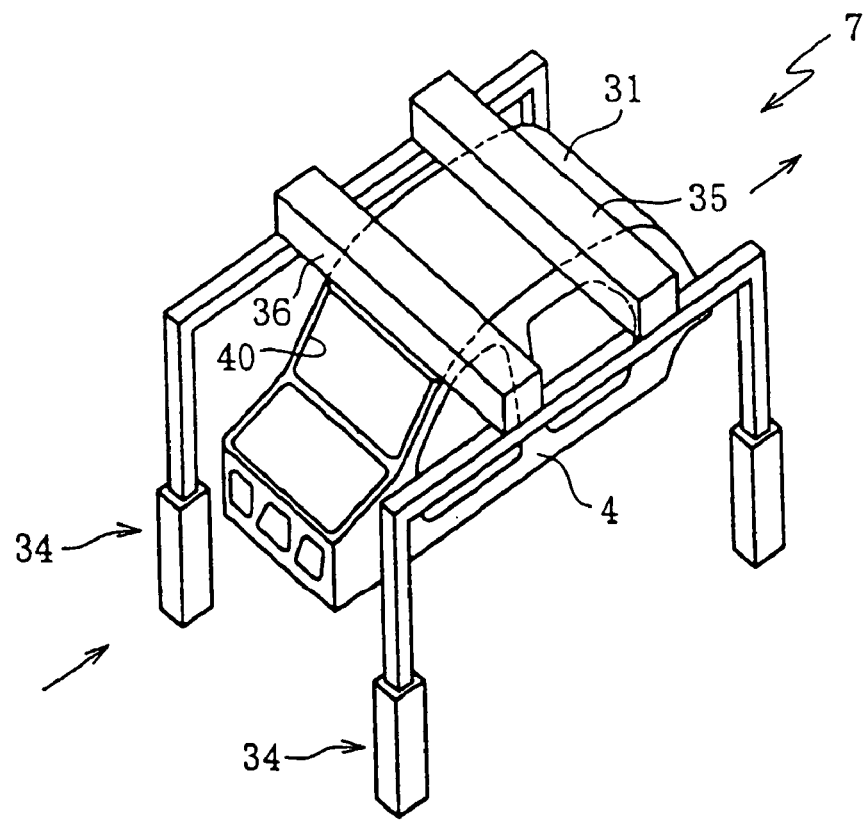
FIG. 14 is a schematic perspective view illustrating the roof pre-setting station.

After the pre-setting of the roof panel 31, pre-welding of the roof panel 31 is performed at the roof pre-welding station 7. As shown in FIG. 14, the roof pre-welding station 7 is provided with a pair of frames 34 at the sides of the transfer line. A pair of removable joisted jigs 35, 36 are installed over the upsides of the frames, while being spaced to each other in the transfer direction. Further, though not shown in the figure, the station 7 is equipped with a hoist for transferring the jigs 35, 36 and with a spot welding machine for pre-fixing the roof panel 31 to the side member 4. The figure of example specifically illustrates the roof 31 as a part to be assembled with side members 4, however, the present invention is not only for the mentioned part but also can be applied to assembly of any part (a header board or frame back, for example) to be laid across side members 4. Alternatively, a reinforcement may be installed across the two frames 34.

Figure 15:
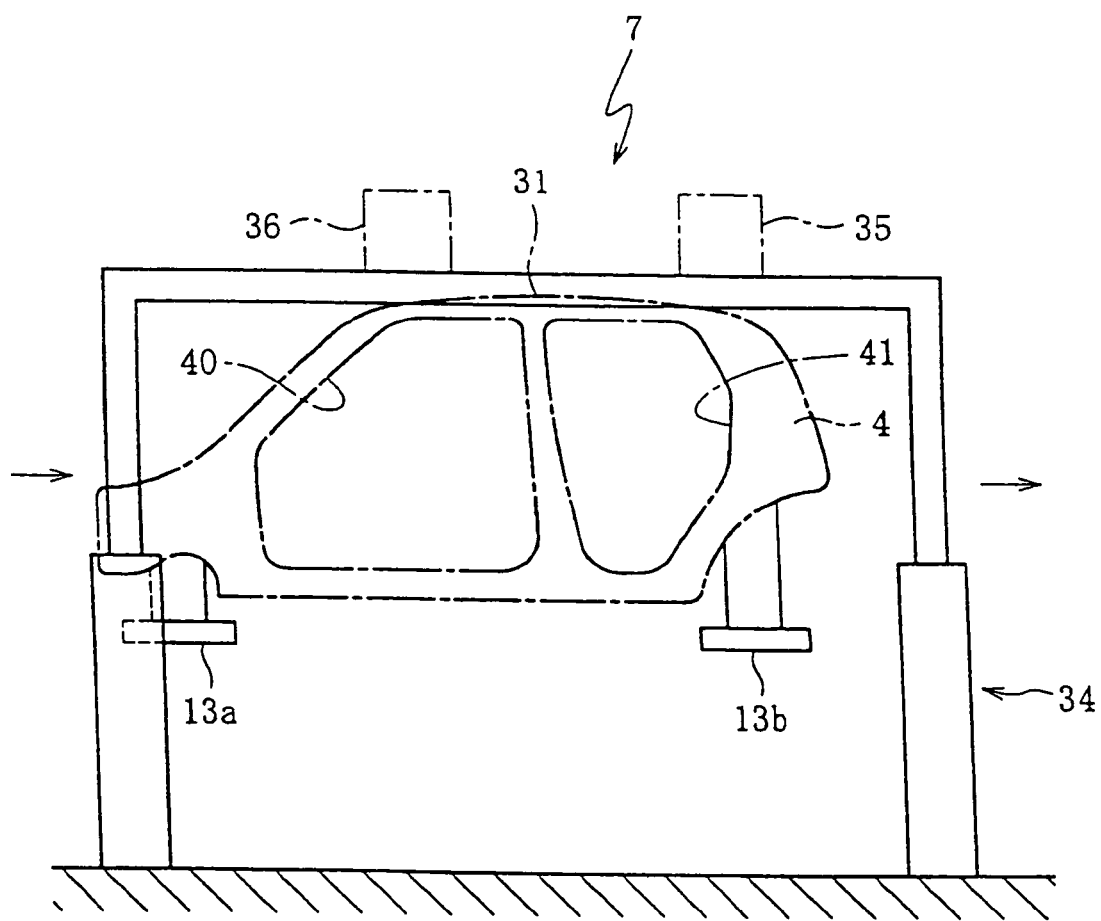
FIG. 15 is a schematic side view of the roof pre-setting station.

As shown in FIG. 15, the frame 34 includes vertical portions spaced to each other in the transfer direction and a horizontal portion connecting the vertical portions. The horizontal portion includes a top surface provided with a clamp mechanism for removably attaching the joisted jigs 35, 36.

Figure 16:
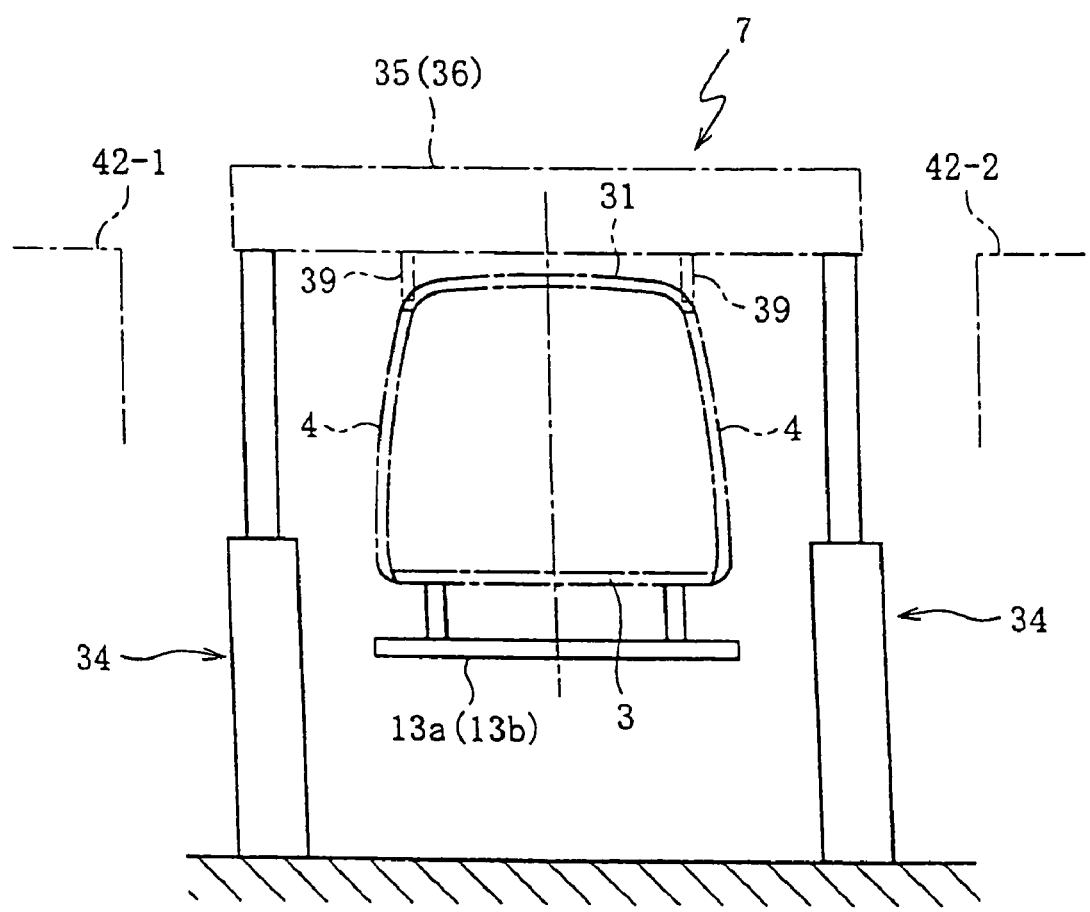
FIG. 16 is a schematic front view of the roof pre-setting station.

As shown in FIG. 16, each of the joisted jigs 35, 36 includes a bottom side provided with a pair of clamp arms 39. The clamp arm 39 is manually operated or driven by an air cylinder, for connecting an upper welding end of the side member 4 to a welding end of the roof panel 31.

As shown in FIG. 14 or 15, the roof panel 31 is positioned by the side members 4, whereby a front window opening 40 and a rear window opening 41 are formed. According to the present invention, the openings are not distorted and can be formed as desired. It is because the roof panel 31 and the side members 4 are properly located relative to each other as the roof panel 31 and the side members 4 are located relative to the same stationary floor. Specifically, the side member 4 is permanently welded to the underbody 3 at the previous station 6. Further, the coasters 13a, 13b supporting the underbody 3 are placed on a stationary system including the floor. Thus, the side member 4 is, though indirectly, fixed to the stationary system. On the other hand, the roof panel 31 can be also fixed to the same stationary system via the frame 34 (and the joisted jigs 35, 36). As a result, the roof panel 31 and the side members 4 can be firmly positioned relative to each other, whereby the front window opening 40 and the rear window opening 41 can be formed as desired.

Figure 17:
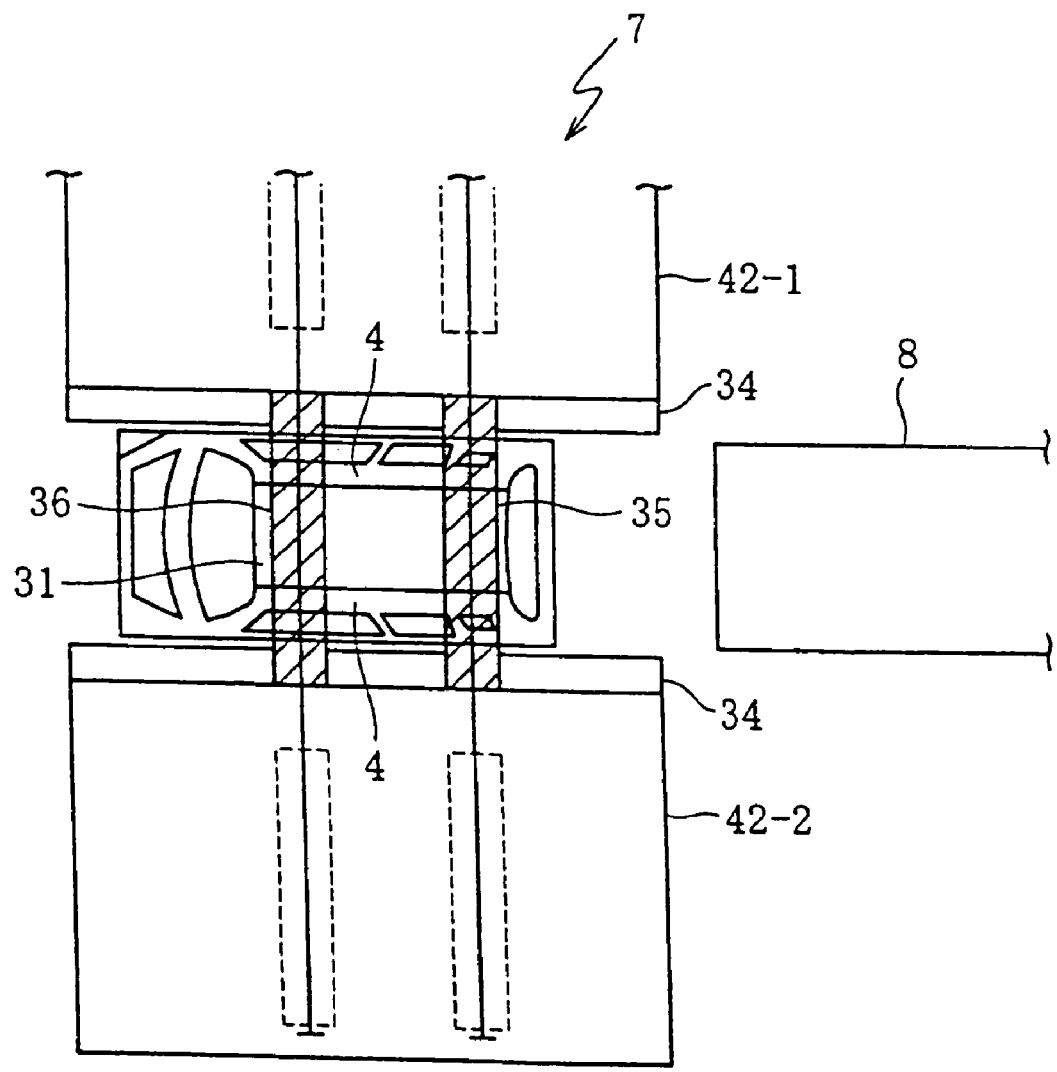
FIG. 17 is a schematic plan view of the roof pre-setting station.

As the clamp arms 39 provided at joisted jigs 35, 36 vary with the car type, it is necessary to change the individual clamp arm 39 according to a car type changed. In the illustrated example, whole units of joisted jigs 35, 36 including the clamp arm 39 are assigned for respective car types, and a plurality of types of joisted jigs 35, 36 are prepared near the car body assembly line. The joisted jigs 35, 36 are attached to the horizontal portion of the frame 34. Thus, as shown in FIGS. 16 and 17, the joisted jigs 35, 36 are desirably stored at platforms 42-1, 42-2 (of almost the same height as the frame 34) provided adjacent to the car body assembly line.

The joisted jigs 35, 36 may be stored at one of the platforms 42-1, 42-2. In this case, for example, a replacing jig to be attached to the frame 34 is stored at the platform 42-1, and a used jig removed from the frame 34 is stored at the platform 42-2. In this way, replacement of the jigs can be effectively performed.

The joisted jigs 35, 36 are spaced to each other longitudinally of the roof panel 31, thereby providing a wide working space. Therefore, welding operation by the worker is facilitated, and a pre-welding device and a permanent welding device can be installed together. Further, the easy access to the welding points allow use of a welding machine with relatively small reach.

Conventional jigs for the roof panel are larger than the roof panel, thereby requiring large business investment and much time for replacing the jigs. Contrary, the jigs according to the present invention are elongated and thus don't take much space, thereby not obstructing the operation even if it is stored near the car body assembly line. Further, as described above, replacement of the jigs is much easier.

FIG. 18A shows a transfer device (indicated by reference number 50) for replacing the joisted jigs 35, 36. As shown, the reference number 51 indicates a ceiling rail 51 from which a hoist 52 is hung. The hoist 52 moves a movable rail 53 up and down (see FIG. 18B). A fixed rail 54 is provided below the ceiling rail 51, which includes a space 55 where movable rail 53 fits in. The fixed rail 54 is provided with a stopper 56 for delimiting elevation of the movable rail 53. The jig 35 (36) is hanged by a plurality of pulleys 57. The pulley 57 is movable along the movable rail 53 and fixed rail 54.

Figure 19A:
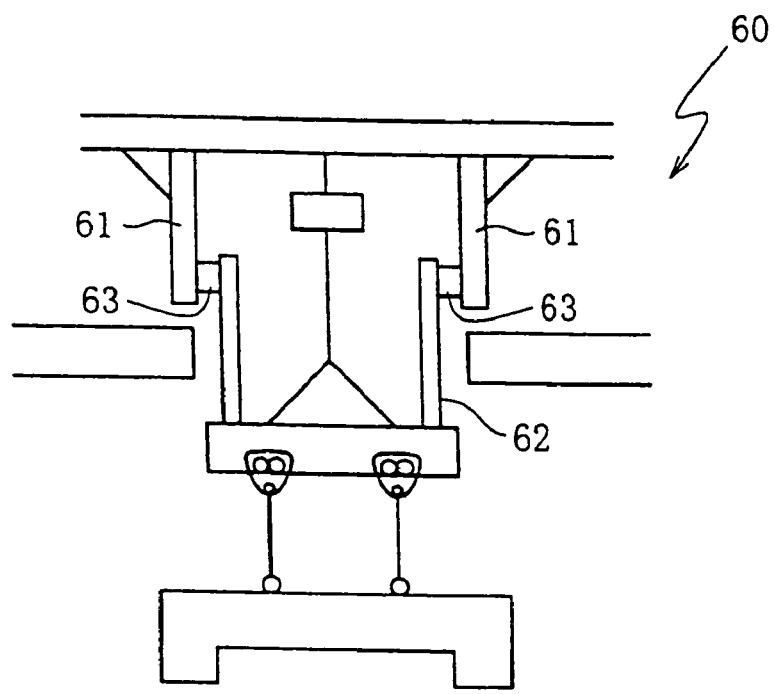
FIG. 19A is a schematic view illustrating a swaying prevention mechanism for the movable rail shown in FIG. 18B.
Figure 19B:
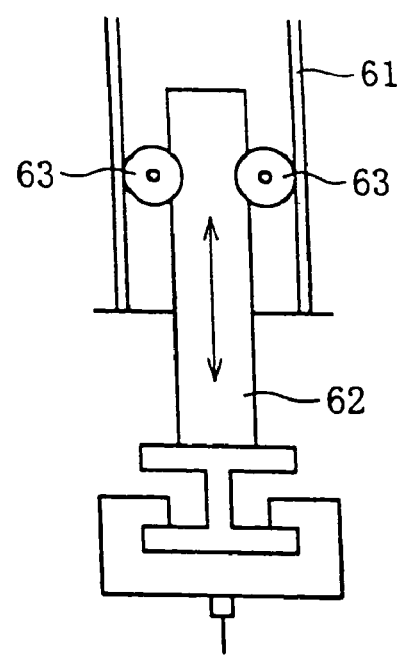
FIG. 19B is a side view illustrating the main part of the swaying prevention mechanism.

As shown in FIG. 18A, the pulleys 57 hung with the joisted jig 35 (36) is transferred along the fixed rail 54 to the movable rail 53. Thereafter, as shown in FIG. 18B, the movable rail 53 is lowered by the hoist 52, and the joisted jig 35 (36) is placed on the frames 34. A rail swaying prevention mechanism 60 as shown in FIGS. 19A, 19B is provided for preventing the movable rail 53 from swaying while lowering the joisted jig 35 (36). The illustrated mechanism 60 includes a fixed guide 61 installed at and hung from the ceiling, an upright bar 62 installed on the movable rail 53, and a rotatable roller 63 installed at the upright bar 62. As shown in FIG. 19B, the roller 63 rolls at the inner wall of the fixed guide 61 as the upright bar 62 moves up and down.

Figure 20A:
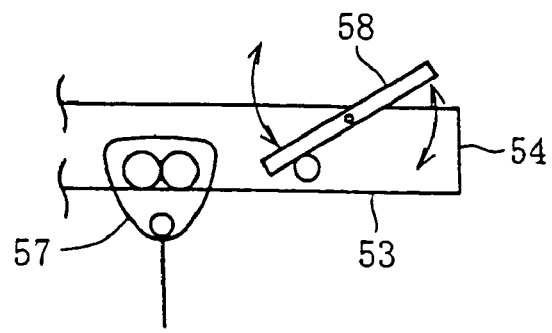
FIG. 20A is a front view illustrating a pulley fall-out preventing device provided on the movable rail shown in FIG. 18B.
Figure 20B:
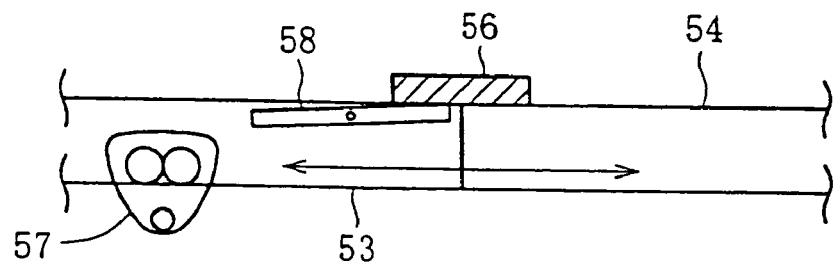
FIG. 20B is a view illustrating a stopper of the falling-out preventing device, the stopper being in a release position.

When the movable rail 53 is lowered (see FIG. 18B), the pulleys 57 may fall out of the movable rail 53. To prevent the falling out, for example, stopping levers 58 as shown in FIGS. 20A, 20B may be provided at both ends of the movable rail 53. The stopping lever 58 turns on the pivot, and when the movable rail 53 is lowered, takes a position as shown in FIG. 20A due to the biasing force of a spring (not shown), when the movable rail 53 is lowered. As shown in FIG. 20B, when the movable rail 53 is lifted up and fits in the space 55 of the fixed rail 54, the upper end of the stopping lever 58 is pushed down by the stopper 56. In this way, the stopping lever 58 is brought into a horizontal posture, whereby the pulley 57 can move from the movable rail 53 to the fixed rail 54 (and vice versa).

Figure 21:
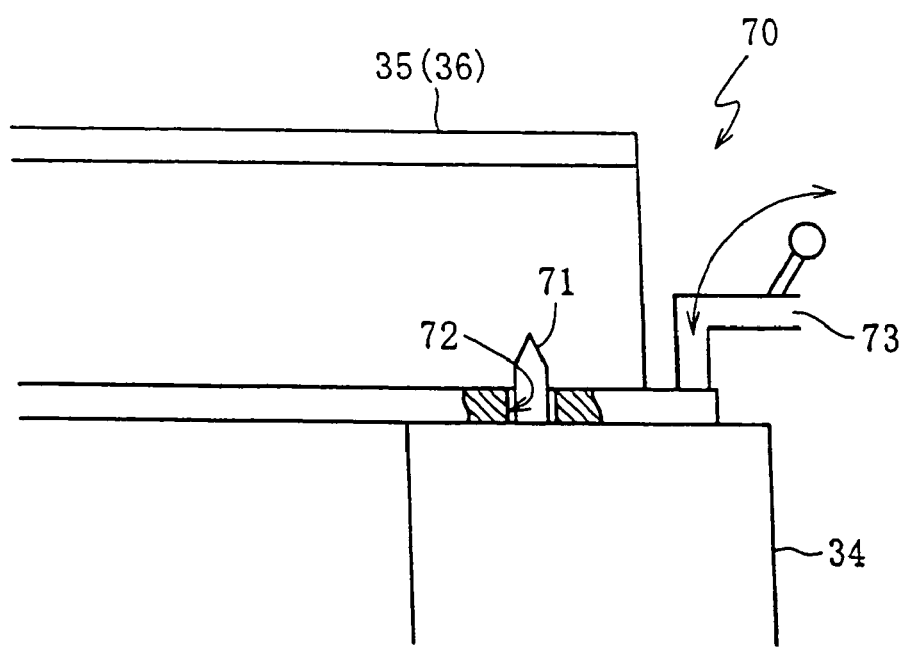
FIG. 21 is a view illustrating a locating clamp mechanism for the locating joisted jigs.

FIG. 21 illustrates a locating mechanism 70 for fixing the joisted jig 35 (36) to the frame 34. In the illustrated example, a locating pin 71 protrudes from the top surface of the frame 34, while the joisted jig 35 (36) includes a hole 72 in which the locating pin 71 to be inserted. After the locating pin 71 is inserted in the hole 72, a clamp arm 73 is used to fix the joisted jig 35 (36) to the frame 34.

Figure 22A:
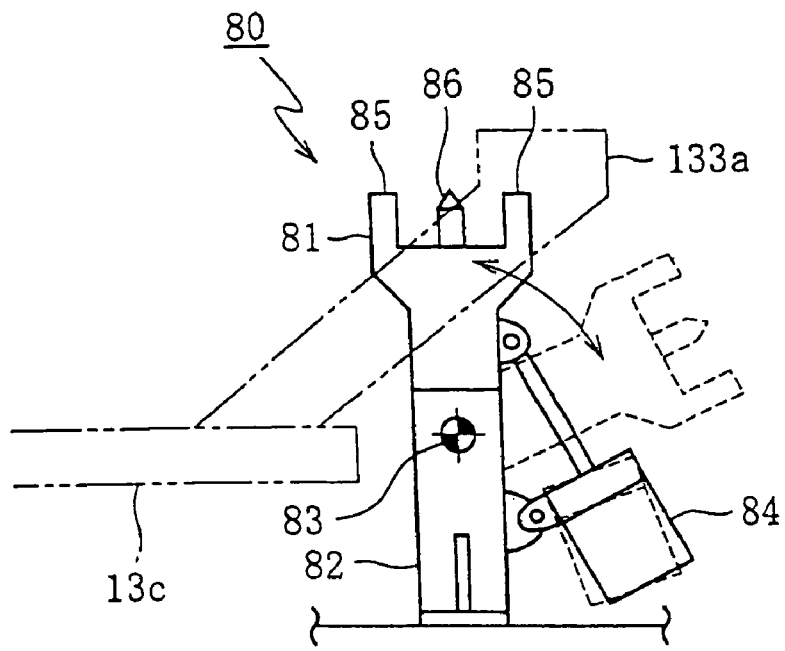
FIG. 22A is a front view illustrating the workings of a locating mechanism located near the transfer line.
Figure 22B:
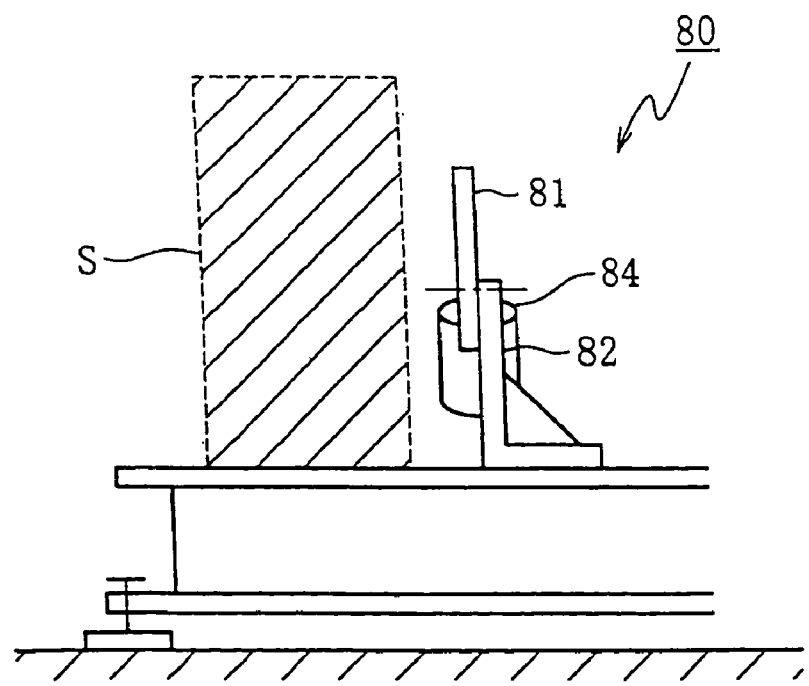
FIG. 22B is a side view illustrating the space for installing an additional locating mechanism.

FIGS. 22A and 22B illustrate a locating mechanism 80 which may be provided near the car body assembly line. The mechanism 80 includes an upper part 81 and a lower part 82, and the lower part 82 is fixed to the floor while the upper part 81 is rotatable and joined to the lower part 82 with a pin 83. As shown in FIG. 22A, the lower part 82 is provided with an air cylinder 84, while the upper part 81 is connected to a drive rod of the air cylinder 84. The upper part 81 is brought into a vertical posture (illustrated by solid lines) or an inclined posture (illustrated by broken lines) by moving the drive rod out from and into the air cylinder body. The upper part 81 is provided with two spacers 85 and one locating pin 86.

As described above, the inclinable structure of the upper part 81 prevents the interference between an object transferred along the assembly line and the locating mechanism 80. In case, for example, of a coaster 13c that includes body-receiving parts 133a protruding in lateral direction as illustrated by—chain double-dashed lines in FIG. 22A, the inclined posture of the upper portion 81 enables proper transfer of the coaster 13c along the assembly line without being obstructed by the locating mechanism 80.

According to the present invention, in addition to the above-described locating mechanism 80, another locating mechanism of different type may be provided. In this case, as shown in FIG. 22B, a space S for the additional mechanism is provided near the mechanism 80 (or at other place).

The present invention being thus described, it is obvious that the same may be modified in various ways. Such modifications should not be regarded as a departure from the spirit and scope of the invention, and all such modifications as would be obvious to those skilled in the art are intended to be included in the scope of the appended claims.

The invention claimed is:

1. A method of assembling a car body, the method comprising: locating a lower end of a vertical side member relative to an end of an underbody held in a predetermined position of a car body assembling line; locating the side member to the underbody at not less than two portions of the lower end; and temporarily welding, in such a locating state, the side body to the underbody;

the car body assembly line being provided, in a vicinity thereof, with a slide base which is movable between an advanced position adjacent to the car body assembly line and a retreated position away from the car body assembly line, the car body assembly line being provided, in a vicinity thereof, with a locator which is removably placed on the slide base for locating the side member, the car body assembly line being provided, in a vicinity thereof, with a lifter for placing the locator on the slide base when the slide base is located at the retreated position, the lifter extending from the retreated position to the advanced position of the slide base, the locator being placed onto the lifter when the lifter is at an upper limit, the locator being placed onto the slide base when the lifter is lowered, the side member being supported by the locator, and the slide base being moved to the advanced position for locating the side member relative to the underbody.

2. The method according to claim 1, wherein the lifter is lifted up for detaching the locator from the slide base, and wherein when the lifter is at the upper limit, the locator is removed from the lifter, while another locator is placed onto the lifter, then the lifter being lowered for placing said another locator onto the slide base.

3. The method according to claim 1, wherein the locator is smaller than the side member, as viewed in a vertical direction and in a direction parallel to a transfer direction of the car body assembly line.

4. The method according to claim 1, wherein the slide base is provided with a plurality of upwardly protruding locating pins, the locator being formed with a plurality of insertion holes corresponding to the locating pins.

5. The method according to claim 1, wherein the locator includes a bottom surface provided with a plurality of wheels for facilitating positional shift of the locator.

6. The method according to claim 5, wherein the lifter includes two supporting plates spaced from each other, the locator being placed on the supporting plates via the wheels.

7. The method according to claim 6, wherein the two supporting plates are spaced from each other at a distance great enough to allow insertion of the slide base therebetween.

8. The method according to claim 6, wherein each of the supporting plates of the lifter is provided with a locating member for engaging with the wheel.

9. The method according to claim 1, wherein the side member is located relative to the underbody by being supported by the locator and an additional locator.

10. The method according to claim 9, wherein the two locators are connected to each other via a connecting rod and moved synchronously by the connecting rod.

* * * * *